United States Patent
Kotani

(10) Patent No.: US 7,738,735 B2
(45) Date of Patent: Jun. 15, 2010

(54) IMAGE PROCESSING APPARATUS FOR RESIZING OF IMAGES, IMAGE PROCESSING METHOD FOR RESIZING IMAGES, PROGRAM, AND STORAGE MEDIUM

(75) Inventor: Takuya Kotani, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 767 days.

(21) Appl. No.: 11/200,821

(22) Filed: Aug. 10, 2005

(65) Prior Publication Data
US 2006/0039630 A1 Feb. 23, 2006

(30) Foreign Application Priority Data
Aug. 23, 2004 (JP) ............................. 2004-242633
Jun. 30, 2005 (JP) ............................. 2005-193089

(51) Int. Cl.
*G06K 9/32* (2006.01)
(52) U.S. Cl. ...................... 382/297; 382/298
(58) Field of Classification Search .................. 382/297
See application file for complete search history.

(56) References Cited

U.S. PATENT DOCUMENTS

| 4,631,751 | A | * | 12/1986 | Anderson et al. | ........... 382/298 |
| 4,656,664 | A | * | 4/1987 | Anderson et al. | ........... 382/298 |
| 5,649,033 | A | * | 7/1997 | Morikawa et al. | ........... 382/297 |
| 6,438,274 | B1 | * | 8/2002 | Tokuyama et al. | ........... 382/298 |
| 6,496,608 | B1 | * | 12/2002 | Chui | ........... 382/300 |
| 6,516,154 | B1 | * | 2/2003 | Parulski et al. | ............... 396/287 |
| 6,519,373 | B1 | * | 2/2003 | Kikuchi | ....................... 382/297 |
| 6,526,234 | B1 | * | 2/2003 | Malloy Desormeaux | .... 396/374 |
| 6,539,177 | B2 | * | 3/2003 | Parulski | ....................... 396/287 |
| 6,577,821 | B2 | * | 6/2003 | Malloy Desormeaux | .... 396/374 |
| 2002/0048413 | A1 | * | 4/2002 | Kusunoki | .................... 382/282 |
| 2004/0062451 | A1 | * | 4/2004 | Kita et al. | .................... 382/276 |

FOREIGN PATENT DOCUMENTS

| JP | 6-152862 | 5/1994 |
| JP | 2000-078396 | 3/2000 |
| JP | 2001-347720 | 12/2001 |

* cited by examiner

*Primary Examiner*—Bhavesh M Mehta
*Assistant Examiner*—David P Rashid
(74) *Attorney, Agent, or Firm*—Canon USA Inc IP Div

(57) ABSTRACT

An image processing apparatus configured to obtain a resized image of a suitable size in a case where a plurality of image data are enlarged or reduced, while keeping a vertically long or horizontally long state of the image. Thus, a matched state between a resize object image and a resize rectangle as target values for a resized image as to whether being vertically long or horizontally long is determined. Responsive to a result of determination, the resize rectangle is rotated 90 degrees, and the resize object image is enlarged or reduced such that the enlarged or reduced resize object image is matched with the resize rectangle rotated.

5 Claims, 9 Drawing Sheets

IMAGE PROCESSING APPARATUS FOR RESIZING OF IMAGES, IMAGE PROCESSING METHOD FOR RESIZING IMAGES, PROGRAM, AND STORAGE MEDIUM

BACKGROUND OF THE INVENTION

1. Field of the Invention

The present invention relates to an information processing apparatus generally called a personal computer (hereinafter referred to as a PC) being operated as an image processing apparatus, and in particular, the present invention relates to an image processing apparatus configured to edit an image captured by a digital still camera and the like by enlarging or reducing the image.

2. Description of the Related Art

In a case where a user manages images captured by an image capture apparatus such as a digital still camera and the like, the user generally uses an image processing application program running on a PC.

Further, in recent years, with the advancement of PC performance, a user can post-process and edit a captured image according to the user's own preference. In the meantime, miniaturization and large capacity of storage media have rapidly progressed to such an extent that digital still cameras can capture a large number of images.

Under such circumstances, in order to effectively perform post processing on a large number of captured images, various tools are emerging which set parameters for image processing for every image, for example, resize processing such as enlarging or reducing an image, and finally collectively process images.

However, in a case where images are collectively processed by a PC, there are the following problems. First, to perform the resize processing using the collective processing, it is a common practice for a user to specify an output rectangle, and then, (1) to forcibly resize an image to the size of the specified output rectangle, or (2) to resize an image to a size where the image is inscribed or circumscribed by the specified output rectangle.

However, in a case where images to be processed contain both a vertical image in which its height is larger than its width and a horizontal image in which its width is larger than its height, the above method (1) may create the following problem.

That is, there is a problem that if the vertical image is resized to a horizontally-long specified rectangle or if the horizontal image is resized to a vertically-long specified rectangle, the resized image becomes extremely distorted with respect to the original image, and eventually becomes non-practicable.

On the other hand, according to the method (2), there are cases where the output size becomes greatly different between the vertical image and the horizontal image. For example, in a case where a vertical image having 800 pixels vertical and 600 pixels horizontal is set to be outputted as an image having 640 pixels vertical and 480 pixels horizontal, the resized output image becomes a vertical image having 640 pixels vertical and 480 pixels horizontal. Thus, no problem is arisen. However, in a case where a horizontal image having 600 pixels vertical and 800 pixels horizontal is set to be outputted as an image having 640 pixels vertical and 480 pixels horizontal, the resized output image becomes a horizontal image having 360 pixels vertical and 480 pixels horizontal, which is an extremely small image compared to the set number of pixels.

FIG. 10 is a view illustrating these problems. FIG. 10 shows a case where the same resize output rectangles 1011 to 1013 are specified with respect to resize object images 1001 to 1003. In the case of the resize object images 1001 and 1003, since the vertical-to-horizontal relation is not extremely different from the resize output rectangles 1011 and 1013, practical resized images 1021 and 1023 can be obtained.

On the other hand, in the case of the resize object image 1002, since the vertical-to-horizontal relation is extremely different from the resize output rectangle 1012, a reduced resized image 1022 is eventually obtained.

In view of such problems, with regard to a resize processing accompanied with the rotation of an image, there is a known technique in which, when a copy is made, rotation of an image is performed as occasion demands, and a magnification varying processing is performed on the rotated image (for example, Japanese Patent Application Laid-Open No. 6-152862, corresponding to U.S. Pat. No. 5,649,033).

In this technique, an image (resize object image) obtained by reading an original is rotated so as to be matched with the orientation of an output sheet, and the size of a resultant copy becomes the same as that of the output sheet (resize output rectangle).

However, the above technique is not directed to acquiring a resized image whose orientation is the same as the orientation of an original. In a copying machine such as that disclosed in Japanese Patent Application Laid-Open No. 6-152862, no real problem is arisen. However, particularly in the case of an image captured by a digital still camera, a major problem is arisen if the orientation of the image is changed.

SUMMARY OF THE INVENTION

The present invention is directed to an image processing apparatus and a control method thereof in order to provide a technique in which, when a large number of images are collectively resized, each image can be acquired as a resized image of an adequate size while keeping a vertically long or horizontally long state thereof.

In one aspect of the present invention, an image processing apparatus for performing resize processing of enlarging or reducing image data includes a resize rectangle specifying unit configured to allow specifying a first resize rectangle indicating target values of vertical and horizontal dimensions with respect to are sized image, an image orientation determining unit configured to determine a matched state between are size object image which is an object of the resize processing and the first resize rectangle as to being one of vertically long and horizontally long, a resize rectangle changing unit configured to, responsive to a determination by the image orientation determining unit, generate a second resize rectangle by rotating the first resize rectangle 90 degrees such that longer side directions of the first resize rectangle and the resize object image are matched with each other, and a resize executing unit configured to, without rotating the resize object image, one of enlarge and reduce the resize object image such that the enlarged or reduced resize object image is matched with the second resize rectangle.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the invention will be described in detail below with reference to the drawings.

First Embodiment

Figure 1:
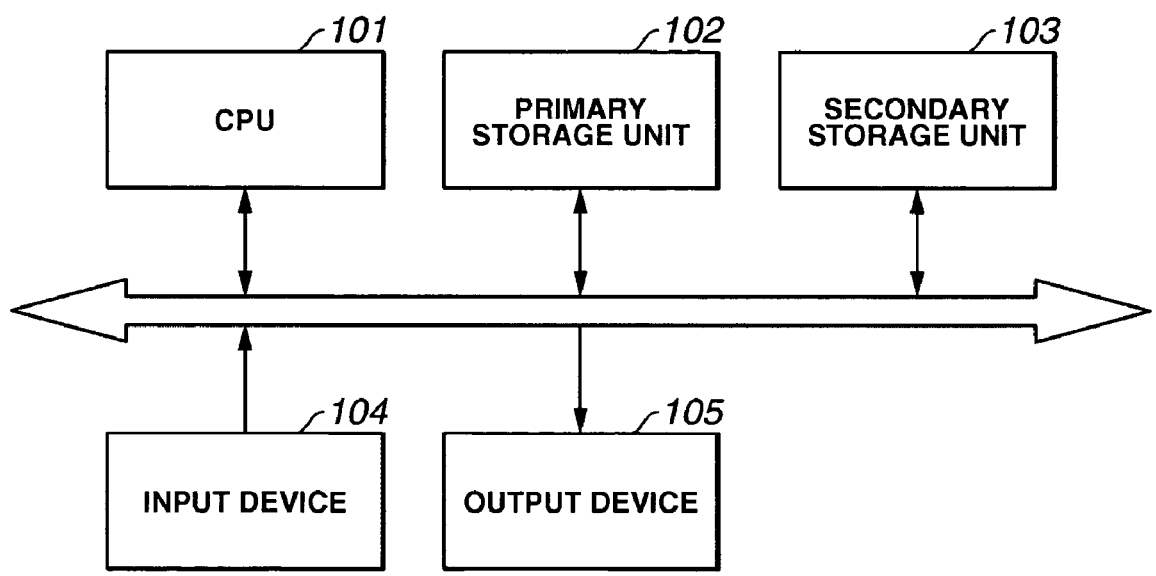
FIG. 1 is a schematic block diagram of an image processing apparatus according to a first embodiment of the present invention.

FIG. 1 is a schematic block diagram of an image processing apparatus according to a first embodiment of the present invention.

In FIG. 1, a CPU 101 controls the entire operation of the image processing apparatus, and performs execution of a program stored in a primary storage unit 102.

The primary storage unit 102 is, for example, a memory, and reads and stores a program and the like stored in a secondary storage unit 103.

The secondary storage unit 103 is, for example, constituted by a hard disk and the like. Usually, the capacity of the primary storage unit 102 is smaller than the capacity of the secondary storage unit 103, and programs, data and the like which cannot be stored in the primary storage unit 102 are stored in the secondary storage unit 103.

Further, data and the like that must be stored for a long period of time are also stored in the secondary storage unit 103. In the first embodiment, a program is stored in the secondary storage unit 103, and the program is read into the primary storage unit 102 when the program is to be executed. Then, the CPU 101 executes the program.

An input device 104 includes, for example, a mouse and a keyboard used for controlling the image processing apparatus, as well as a card reader, a scanner, a film scanner and the like which are required for inputting image data. An output device 105 includes, for example, a display monitor, a printer and the like.

Figure 2:
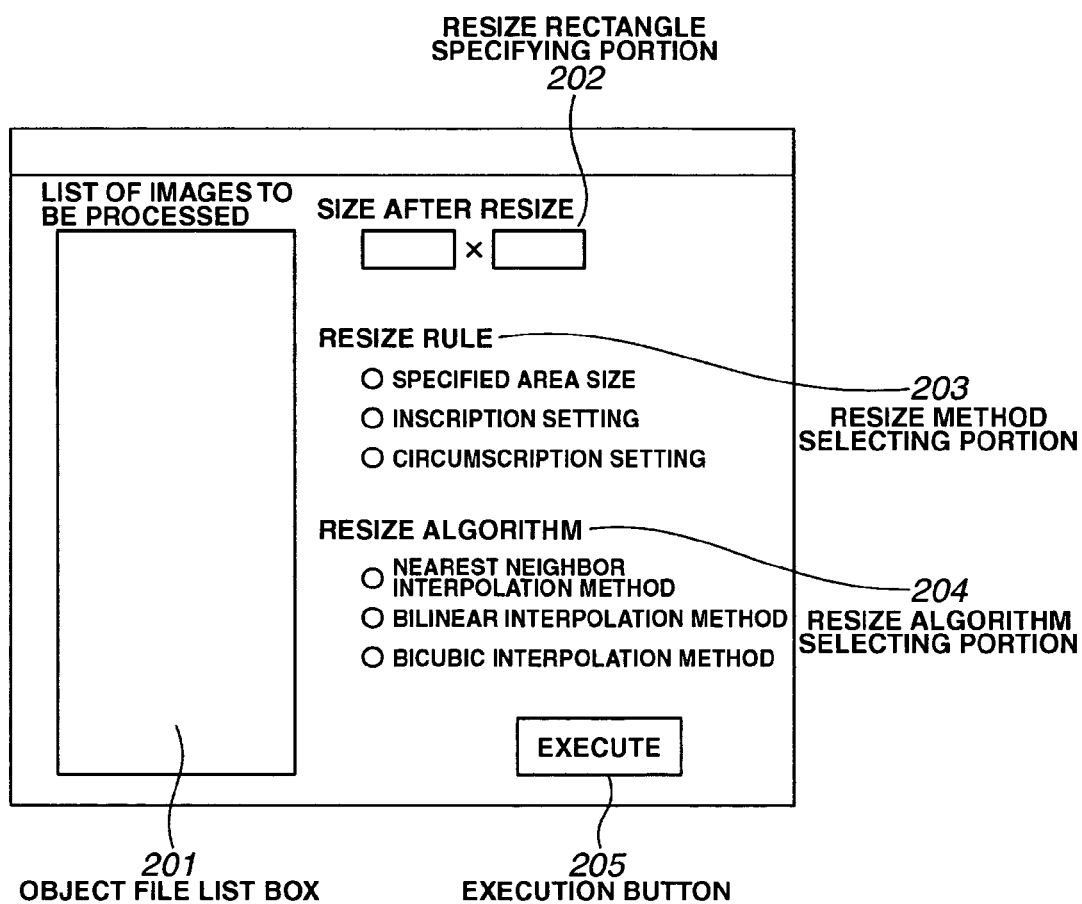
FIG. 2 is a view showing an example of a user interface according to the first embodiment.

FIG. 2 is a view showing a user interface for use in the image processing apparatus according to the first embodiment.

Here, a resize rectangle means a rectangle configured by a width and a height which represent the size of an output image. Depending on a resize method, the size of a resize rectangle may not necessarily be matched with an actual output image size. Therefore, the term "resize rectangle" is used rather than output image size. In the resize rectangle, its vertical and horizontal dimensions can be specified by using the number of pixels or can be specified by using an output resolution of a resize object image and a physical device output size. For example, the vertical and horizontal dimensions can be specified as ["a" pixels width X "b" pixels height], ["x" cm width X "y" cm height, "z" pixels/cm], and the like.

In FIG. 2, when a user drags and drops a resize object image into an object file list box 201, a file name is added to the object file list box 201. Then, the user specifies the size of a resize rectangle indicating target values of vertical and horizontal dimensions with respect to a resized image, via a resize rectangle specifying portion 202, and selects a resize method via a resize method selecting portion 203. Further, the user selects a resize algorithm via a resize algorithm selecting portion 204. When the user depresses an execution button 205, a resize processing is started.

Resize methods to be selected via the resize method selecting portion 203 include three types such as [specified area size], [inscription setting], and [circumscription setting]. In the case of the specified area size, an image is resized to the same size as the size of the specified resize rectangle. In the case of the inscription setting, an image is resized to the same size as the size of a rectangle which inscribes the resize rectangle specified via the resize rectangle specifying portion 202 and which has the same aspect ratio as that of the resize object image. In the case of the circumscription setting, an image is resized to the same size as the size of a rectangle which circumscribes the resize rectangle specified via the resize rectangle specifying portion 202 and which has the same aspect ratio as that of the resize object image.

Resize algorithms to be selected via the resize algorithm selecting portion 204 include three types such as a nearest neighbor interpolation method, a bilinear interpolation method, and a bicubic interpolation method. Since these algorithms are generally well known techniques, a detailed description thereof will be omitted.

Figure 3:
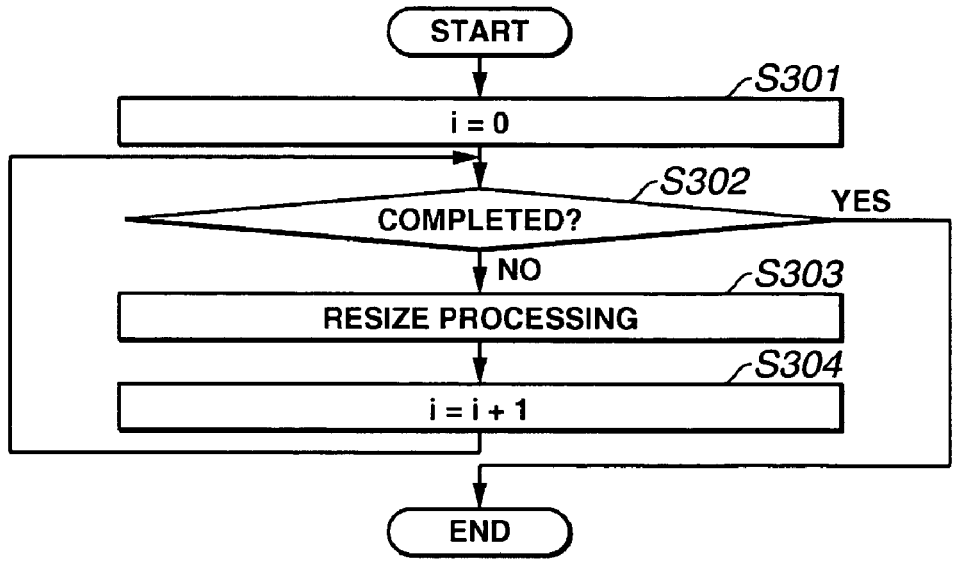
FIG. 3 is a flowchart showing a processing procedure according to the first embodiment.

FIG. 3 is a flowchart showing a processing procedure of the resize execution processing executed after the execution button 205 is depressed.

First, at step S301, a counter (i) is reset to 0. At step S302, the counter (i) is used to determine whether processing for a number of images set as resize object images has been completed. If the processing has been completed, the procedure comes to an end. If the processing has not yet been completed, the procedure proceeds to step S303, where resize processing is executed. The detail of the resize processing will be described later. Next, at step S304, the counter (i) is incremented by one, and the procedure returns to step S302.

Figure 4:
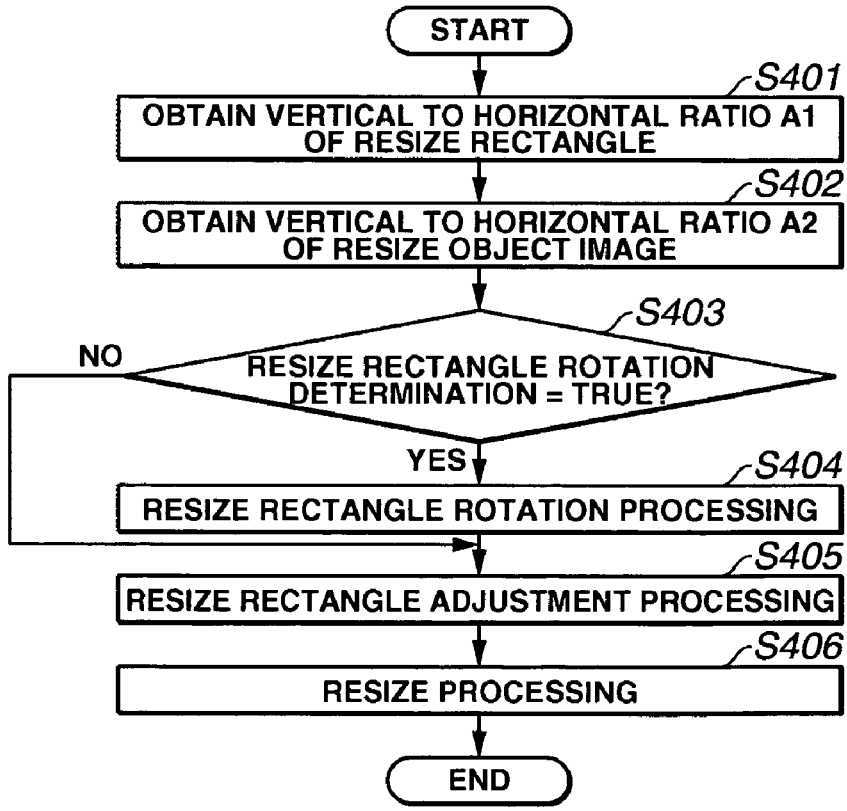
FIG. 4 is a flowchart showing a processing procedure according to the first embodiment.

FIG. 4 is a flowchart showing the resize processing procedure executed for each resize object image. The procedure of FIG. 4 specifies one common resize rectangle for a plurality of resize object images, and shows the processing procedure for enlarging or reducing the plurality of resize object images so as to be matched with the common resize rectangle.

First, the user specifies a resize rectangle indicating target values of vertical and horizontal dimensions with respect to a resized image via the resize rectangle specifying portion 202 shown in FIG. 2. Based on these values, a vertical-to-horizontal ratio A1 of the resize rectangle is obtained at step S401.

In addition, at step S402, a vertical-to-horizontal ratio A2 of a resize object image is obtained.

Here, the vertical-to-horizontal ratio means the ratio of a vertical dimension to a horizontal dimension. In a case where the value of the vertical-to-horizontal ratio is larger than 1.0, an image is referred to as being vertically long, and in a case where the value of the vertical-to-horizontal ratio is smaller than 1.0, an image is referred to as being horizontally long.

Subsequently, at step S403, a resize rectangle rotation determination is performed. The resize rectangle rotation determination means processing to determine:

(1) to be FALSE in a case where both of the vertical-to-horizontal ratio A1 and the vertical-to-horizontal ratio A2 are larger than 1.0 (in other words, in a case where both of the resize rectangle and the resize object image are vertically long), (2) to be FALSE in a case where both of the vertical-to-horizontal ratio A1 and the vertical-to-horizontal ratio A2 are smaller than 1.0 (in other words, in a case where both of the resize rectangle and the resize object image are horizontally long), or (3) to be TRUE in cases other than the above cases (1) and (2) (in other words, in a case where the vertical-to-horizontal length relation differs between the resize rectangle and the resize object image).

In a case where a result of the resize rectangle rotation determination is TRUE, at step S404, the resize rectangle is rotated 90 degrees, and the procedure proceeds to step S405. In a case where a result of the resize rectangle rotation determination is FALSE, the procedure proceeds to step S405.

At step S405, a resize rectangle adjustment processing is performed according to the resize method. The detail of the resize rectangle adjustment processing will be described later.

Finally, at step S406, the resize processing is performed. The resize processing is performed by using the algorithm selected via the resize algorithm selecting portion 204.

With the above-described processing performed, an output image of the image size as close as possible to the specified size can be obtained regardless of whether the resize object image is an vertical image or an horizontal image.

The resize rectangle adjustment processing defines the width and height of a resize rectangle according to the following processing. Here, let the width and height of the resize object image be w and h, respectively, the width and height of the resize rectangle before the resize rectangle adjustment processing be xold and yold, respectively, and the width and height of the resize rectangle after the resize rectangle adjustment processing be xnew and ynew, respectively.

(1) In a case where the resize method is the [specified area size], target values of vertical and horizontal dimensions specified via the resize rectangle specifying portion 202 are used without change. Thus, regardless of the values w and h, xnew=xold and ynew=yold are defined.

Figure 5:
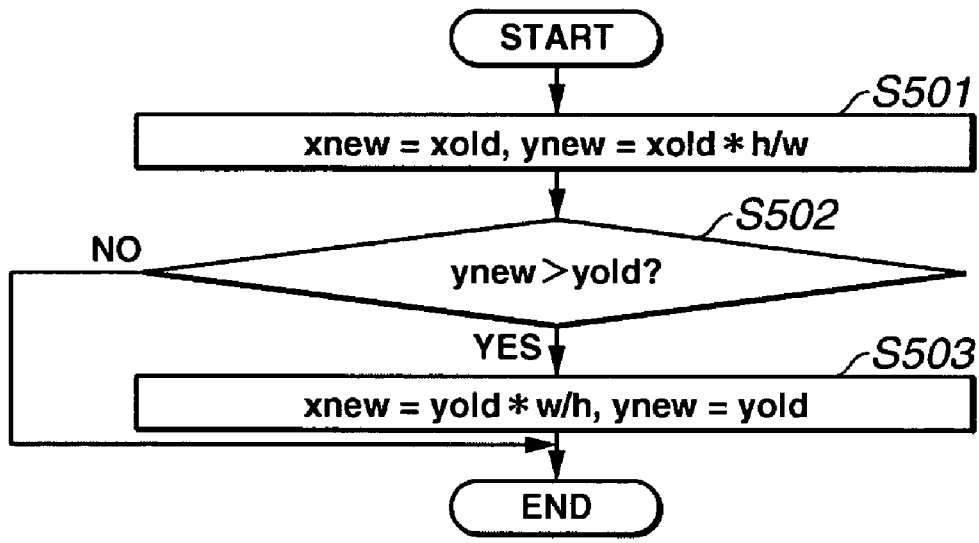
FIG. 5 is a flowchart showing a processing procedure according to the first embodiment.

(2) In a case where the resize method is the [inscription setting], processing shown in FIG. 5 is performed. At step S501, xnew=xold and ynew=xold*h/w are defined. At step S502, it is determined whether ynew is larger than yold. If ynew is larger than yold, the procedure proceeds to step S503. If ynew is not larger than yold, the procedure comes to an end. At step S503, xnew=yold*w/h and ynew=yold are defined, and the procedure comes to an end.

Figure 6:
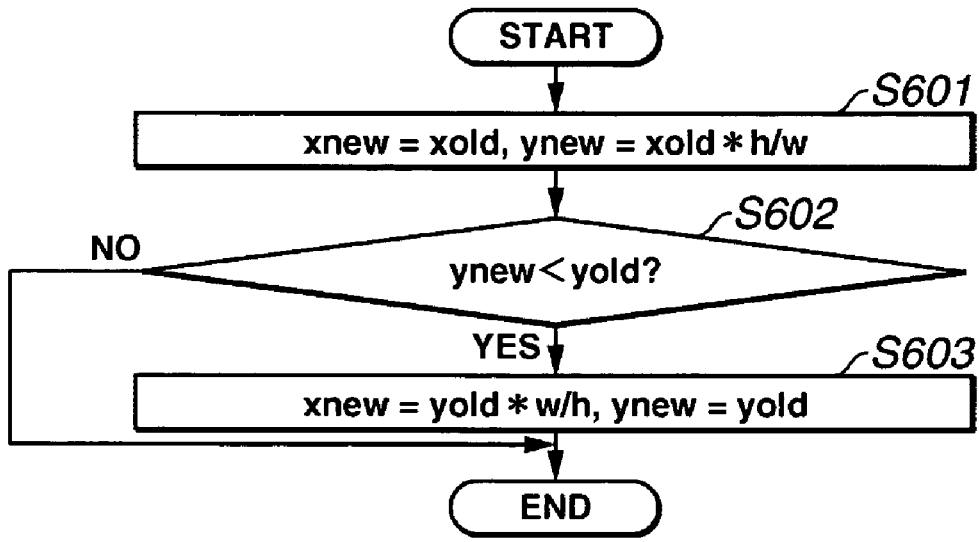
FIG. 6 is a flowchart showing a processing procedure according to the first embodiment.

(3) In a case where the resize method is the [circumscription setting], processing shown in FIG. 6 is performed. At step S601, xnew=xold and ynew=xold*h/w are defined. At step S602, it is determined whether ynew is smaller than yold. If ynew is smaller than yold, the procedure proceeds to step S603. If ynew is not smaller than yold, the procedure comes to an end. At step S603, xnew=yold*w/h and ynew=yold are defined, and the procedure comes to an end.

With the present embodiment configured as described above, in a collective resize processing for a plurality of images, a fine setting can be defined to acquire an output image of a suitable size.

Figure 10:
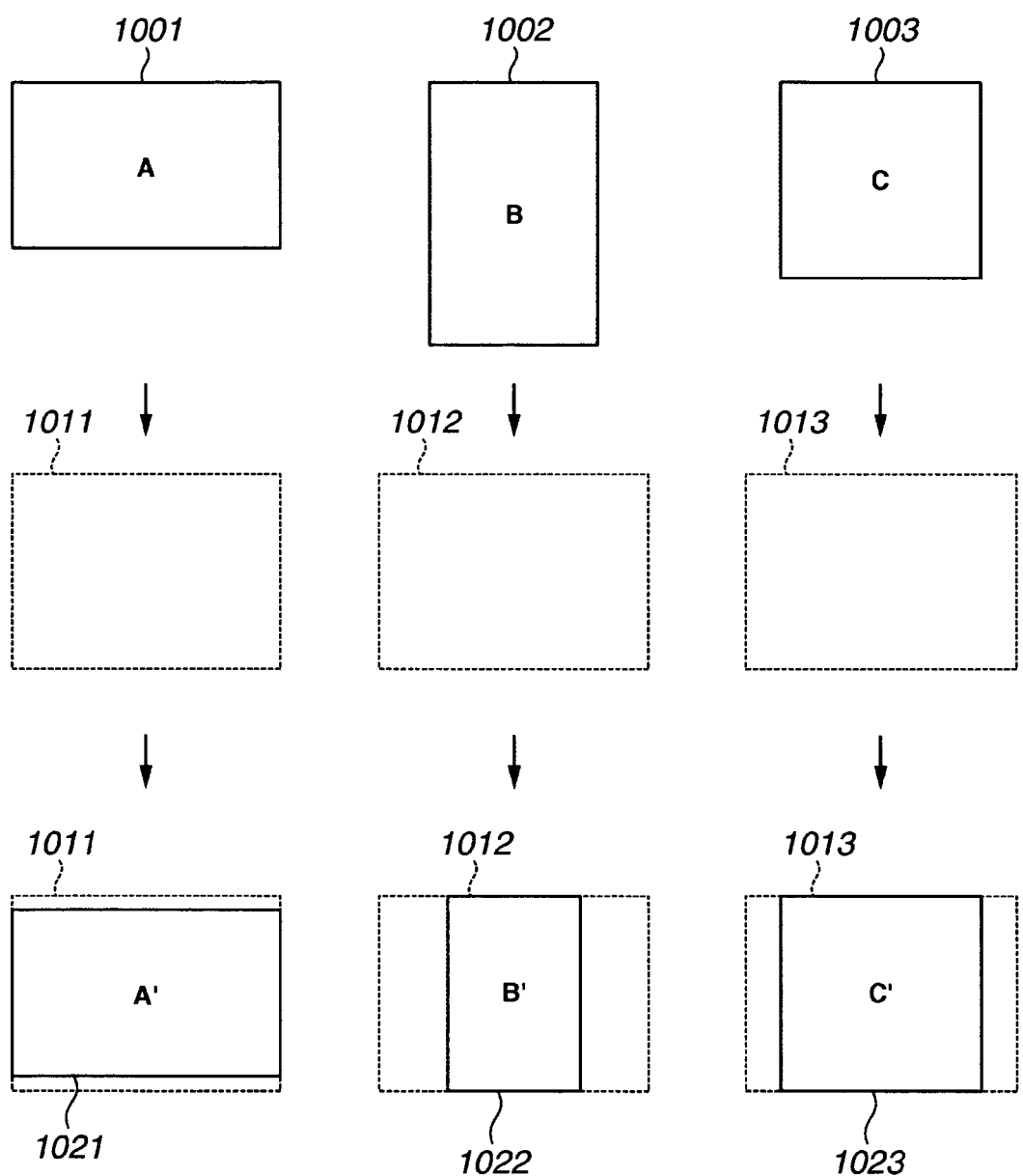
FIG. 10 is a view illustrating problems in the prior art.
Figure 11:
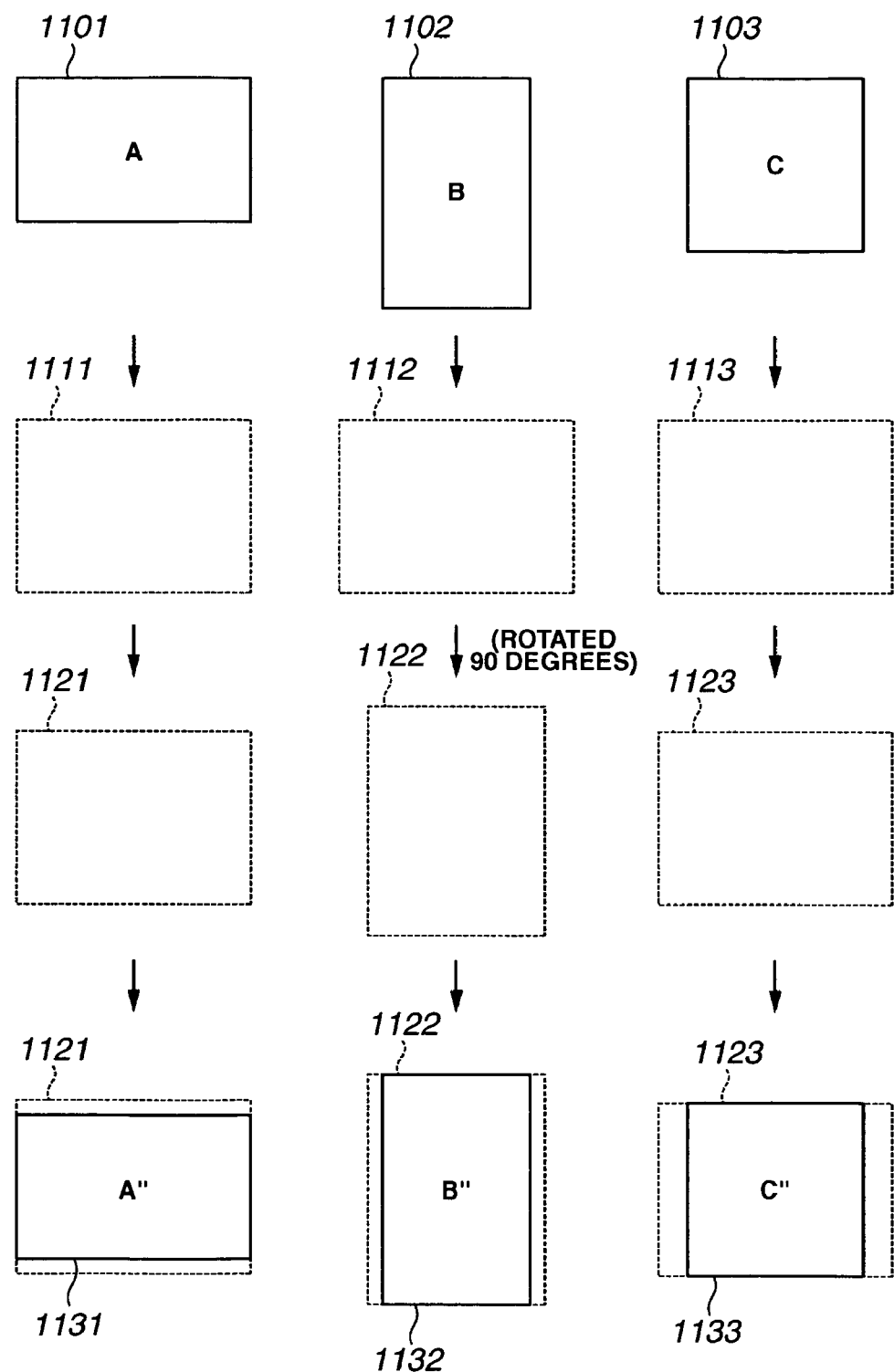
FIG. 11 is a view illustrating solution of the prior art problems according to the present invention.

The advantageous effect of the present embodiment will be described with reference to FIG. 11 as well as FIG. 10. FIG. 11 illustrates a case where the same resize output rectangles 1111 to 1113 are specified with respect to resize object images 1101 to 1103. In the case of the resize object images 1101 and 1103, since the vertical-to-horizontal relation is not extremely different from the resize output rectangles 1111 and 1113, practical resized images 1131 and 1133 can be obtained similar to the case shown in FIG. 10.

On the other hand, in the case of the resize object image 1102, the vertical-to-horizontal relation is extremely different from the resize output rectangle 1112. Therefore, the resize output rectangle 1112 is rotated 90 degrees, thereby becoming a new resize output rectangle 1122. By resizing the resize object image 1102 to be matched with the new resize output rectangle 1122, a practical resized image 1132 can be obtained while keeping a vertically long or horizontally long state thereof.

According to the present embodiment, a rectangle of the same size as that of a resize specifying rectangle referred to as the "resize rectangle" is employed, and the resize rectangle is rotated 90 degrees according to a matched state of the vertical-to-horizontal relation between the resize object image and the resize rectangle. Then, the resize operation is performed based on the resize rectangle.

Second Embodiment

While, in the first embodiment, a description has been made on the case where the resize algorithm is selected by the user, in a second embodiment of the present invention, a description will be made on the case where the resize algorithm is not selected by the user, but an optimum resize algorithm is automatically selected.

Figure 7:
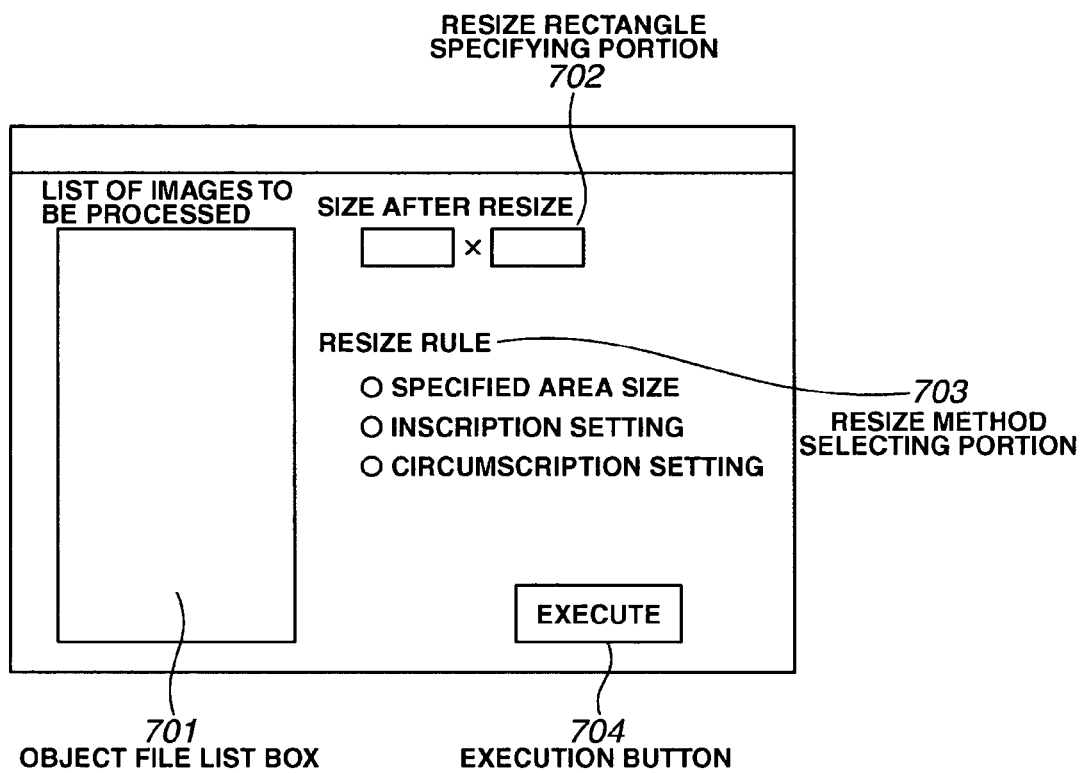
FIG. 7 is a view showing an example of a user interface according to a second embodiment of the present invention.

FIG. 7 is a view showing a user interface for use in an image processing apparatus according to the second embodiment. A point of difference between the second embodiment and the first embodiment is the presence or absence of a resize algorithm selecting portion.

Figure 8:
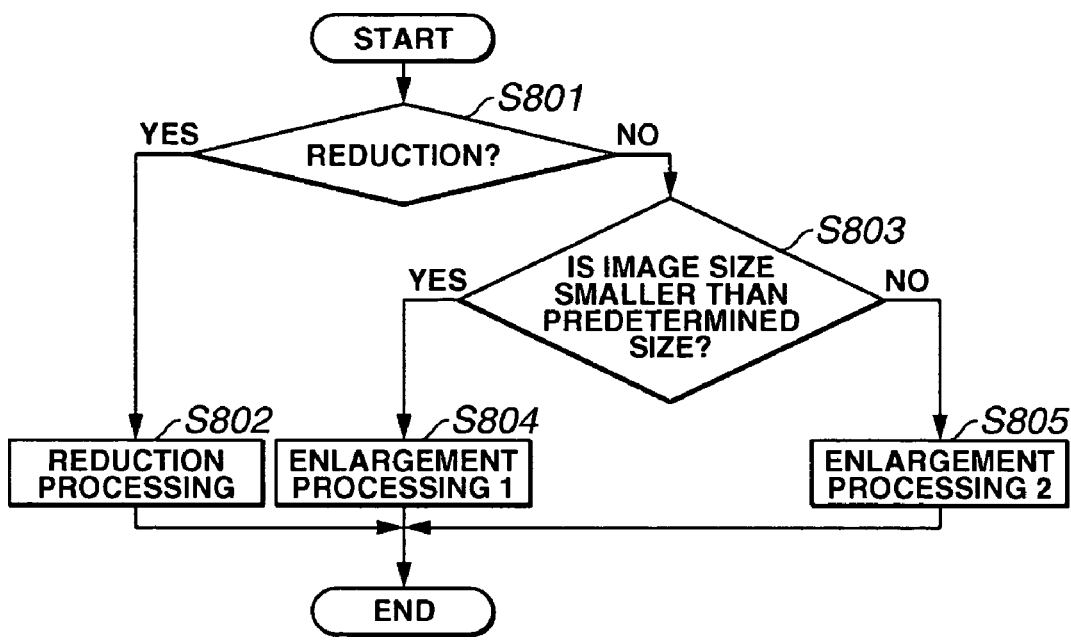
FIG. 8 is a flowchart showing a processing procedure according to the second embodiment.

FIG. 8 is a flowchart illustrating an enlargement/reduction processing.

First, at step S801, it is determined which of enlargement processing and reduction processing is to be applied to a resize object image.

If, at step S801, it is determined that reduction processing is to be applied, the reduction processing is performed using an area-average method at step S802.

If, at step S801, it is determined that enlargement processing is to be applied, the size of the resize target image to be enlarged is checked at step S803. If, at step S803, it is determined that the width of the enlargement target image is less than 100 pixels (an example of the determination of whether the image size is smaller than a predetermined size) and the height thereof is less than 100 pixels, an enlargement interpolation operation is performed using the nearest neighbor interpolation method (enlargement processing 1) at step S804. If, at step S803, it is determined that the width of the enlargement target image is not less than 100 pixels or the height thereof is not less than 100 pixels, an enlargement interpolation operation is performed using the bicubic interpolation method (enlargement processing 2) at step S805.

The reason why the enlargement interpolation processing is branched into two is as follows.

An extremely small image can be presumed to be an an icon or the like. Therefore, an output image that is viewable as if each pixel itself were enlarged by the bicubic interpolation method rather than by a smooth interpolation method such as the nearest neighbor interpolation method is considered to be natural and preferable.

Although it is not indispensable to branch the enlargement processing algorithm as described above, switching the enlargement processing algorithm facilitates obtaining a more appropriate output image.

Third Embodiment

In the above-described first and second embodiments, the same resize processing is uniformly applied to all resize object images regardless of the number of resize object images. However, if the longer side directions of a resize object image and a resize rectangle are matched with each other even in a case where only one image is to be resized, a result of resize processing becomes difficult for the user to intuitively recognize. On the other hand, in a case where a plurality of images is to be resized, it is desirable to perform the resize processing according to the first or second embodiments.

Hence, in a third embodiment of the present invention, a description will be made on the case where processing is changed according to the number of resize object images.

Resize processing in the third embodiment is the same as in the second embodiment, and a user interface in the third embodiment is the same as that shown in FIG. 7.

Figure 9:
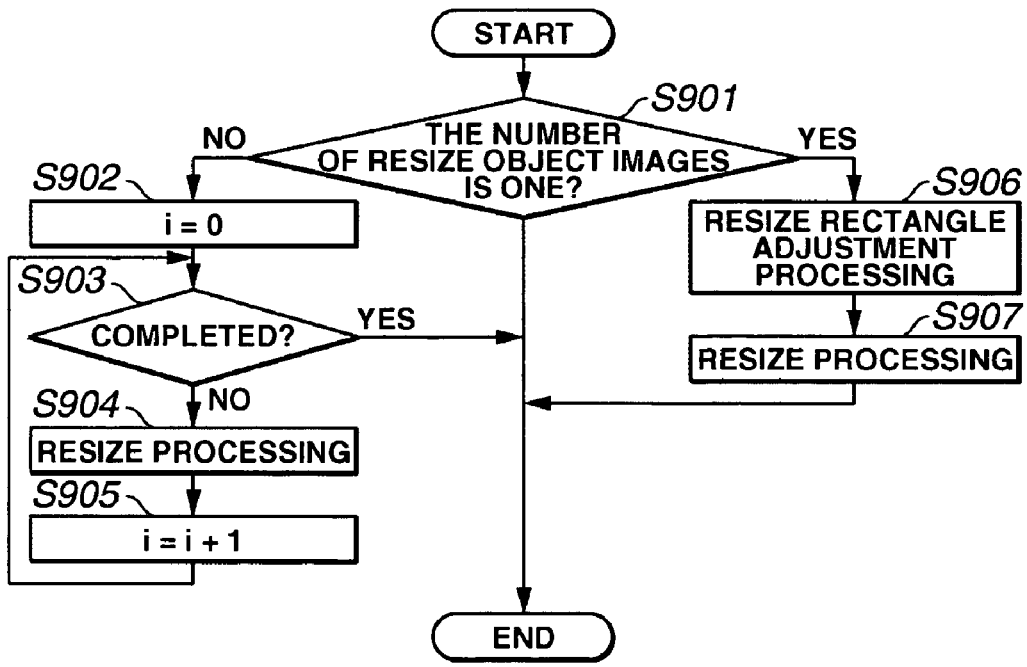
FIG. 9 is a flowchart showing a processing procedure according to a third embodiment of the present invention.

FIG. 9 is a flowchart showing the procedure of processing in the third embodiment, which corresponds to FIG. 3 in the first embodiment.

First, at step S901, it is determined whether the number of resize object images is not less than two. If it is determined that the number of resize object images is not less than two, the procedure proceeds to step S902. After that, a similar processing as in the first embodiment is performed.

If, at step S901, it is determined that the number of resize object images is one, the resize rectangle adjustment processing is performed at step S906 without performing the resize rectangle rotation determination. After that, at step S907, the resize processing is performed. Then, the procedure comes to an end.

With the processing as described above, in a case where only one image is to be resized, resize processing directly using the width and height of a resize rectangle specified by the user can be performed. In a case where two or more images are to be resized, resize processing according to the first or second embodiments can be performed.

In addition, a user may intend to absolutely match a resized image with a specified resize rectangle with respect to the vertical-to-horizontal relation even in a case where a plurality of images are to be resized. That is, the user may intend to collectively process rotation together with enlargement or reduction as resize processing.

Figure 12:
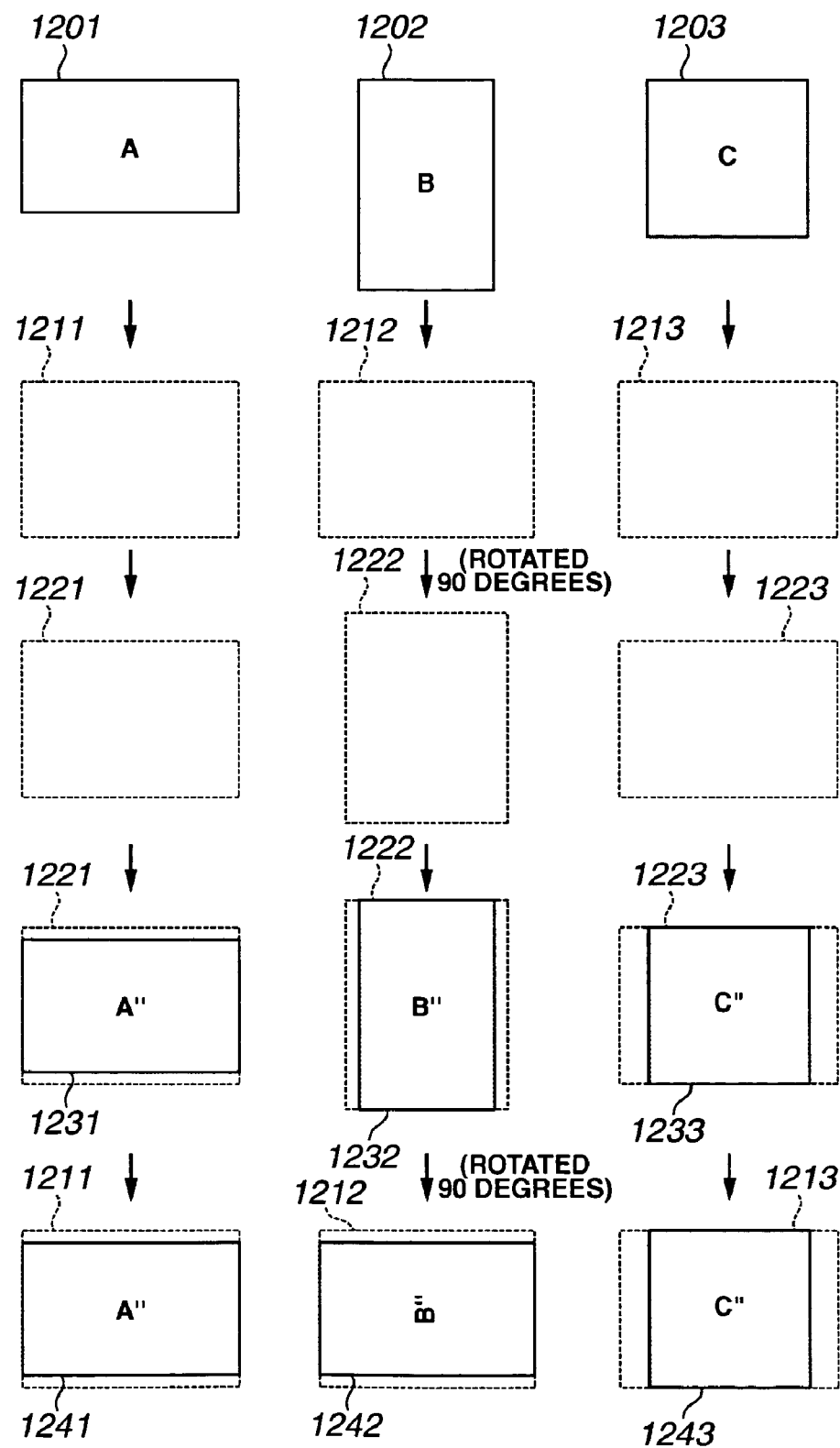
FIG. 12 is a view illustrating operations according to the third embodiment.

In this case, as shown in FIG. 12, after a practical resized image 1232 is obtained in a similar manner as in FIG. 11, a rotation of 90 degrees is applied to the resized image 1232.

Accordingly, a resized image 1242 having the same vertical-to-horizontal relation as a specified resize output rectangle 1212 can be obtained.

Further, as apparent from the description of the first to third embodiments, the present invention can be implemented by an application program running on a general-purpose information processing apparatus such as a personal computer and the like. Accordingly, the present invention covers a computer program. Further, usually, a computer program is stored in a computer-readable storage medium such as a CD-ROM and the like and is executable when it is set into a computer and copied or installed into a system. Accordingly, the present invention covers such a computer-readable storage medium.

As described above, according to the present invention, in a case where a plurality of images are collectively resized, a resized image of the image size as close as possible to the size specified by the user can be efficiently obtained.

In particular, in the case of a group of images in which vertical images and horizontal images coexist, resize processing can be performed while keeping the vertical-to-horizontal relation between a resize object image and a resized image. Accordingly, usability can be improved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-242633 filed Aug. 23, 2004, and Japanese Patent Application No. 2005-193089 filed Jun. 30, 2005, which are hereby incorporated by reference herein in their entirety.

What is claimed is:

1. An image processing apparatus comprising:
a processor that executes processing steps executable by a computer; and
a memory that stores processing steps executable by a computer, the processing steps include;
  (a) a specifying step for specifying sizes of two sides of a resize rectangle, being at right angles to each other, according to numeric values input by a user;
  (b) a determining step for determining which of the specified sizes of the two sides of the resize rectangle are applied to which of sizes of horizontal and vertical sides of an object image to be resized;
  (c) a rotating step for rotating the resize rectangle so that a larger one of the specified sizes of the two sides of the resize rectangle is applied to a longer direction of the object image to be resized, without rotating the object image to be resized, when the longer direction of the specified sizes of the two sides of the resize rectangle is different in direction from the longer direction of the object image to be resized; and
  (d) a resizing step for resizing the object image based on the specified size in the determined horizontal direction and the specified size in the determined vertical direction,
wherein the processing steps further include a determining step for determining whether there are two or more object images, and
wherein directions of the two sides of the resize rectangle are further specified in response to a direction input by the user operation in the specifying step, and if two or more object images are not determined in the determining step, each of the specified sizes of the two sides of the resize rectangle is applied to the vertical size and the horizontal size of the object image respectively in the resizing step, keeping the specified directions of the two sides.

2. The image processing apparatus according to claim 1, wherein the processing steps further include an adjusting step for adjusting the specified sizes of the two sides so that the object image will inscribe or circumscribe the specified sizes of the two sides of the resize rectangle, without changing its aspect ratio, wherein, in the resizing step, the object image is resized by applying each of the specified sizes of the two sides adjusted in the adjusting step to the vertical size and the horizontal size of the object image.

3. The image processing apparatus according to claim 1, wherein the processing steps further include a selecting step for selecting an algorithm to be used in the resizing step from among a plurality of algorithms, based on at least one of (i) which of enlargement processing or reduction processing to be performed on the object image in the resizing step and (2) a size of the object image.

4. An image processing method of an image processing apparatus including a processor, comprising:

a specifying step for specifying sizes of two sides of a resize rectangle, being at right angles to each other, according to numeric values input by a user;

a determining step, performed by the processor, for determining which of the specified sizes of the two sides of the resize rectangle are applied to which of sizes of horizontal and vertical sides of an object image to be resized;

a rotating step for rotating the resize rectangle so that a larger one of the specified sizes of the two sides of the resize rectangle is applied to a longer direction of the object image to be resized, without rotating the object image to be resized, when the longer direction of the specified sizes of the two sides of the resize rectangle is different in direction from the longer direction of the object image to be resized; and a resizing step for resizing the object image based on the specified size in the determined horizontal direction and the specified size in the determined vertical direction; and a determining step for determining whether there are two or more object images, wherein directions of the two sides of the resize rectangle are further specified in response to a direction input by the user operation in the specifying step, and if two or more object images are not determined in the determining step, each of the specified sizes of the two sides of the resize rectangle is applied to the vertical size and the horizontal size of the object image respectively in the resizing step, keeping the specified directions of the two sides.

5. A computer-readable medium having stored thereon a computer program comprising program code having computer-executable instructions for causing a computer to execute the image processing method according to claim 4.

* * * * *